United States Patent
Liu et al.

(10) Patent No.: US 8,416,351 B2
(45) Date of Patent: Apr. 9, 2013

(54) LIQUID CRYSTAL DISPLAY SCREEN

(75) Inventors: Liang Liu, Beijing (CN); Chen Feng, Beijing (CN); Li Qian, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 326 days.

(21) Appl. No.: 12/981,543

(22) Filed: Dec. 30, 2010

(65) Prior Publication Data

US 2011/0299015 A1   Dec. 8, 2011

(30) Foreign Application Priority Data

Jun. 2, 2010 (CN) .......................... 2010 1 0189984

(51) Int. Cl.
*G02F 1/1335* (2006.01)
(52) U.S. Cl.
USPC ................... 349/12; 349/19; 349/24; 349/25; 349/84; 349/139
(58) Field of Classification Search ................ 349/1, 12, 349/19, 24, 25, 84, 139, 158
See application file for complete search history.

(56) References Cited

U.S. PATENT DOCUMENTS

| 7,825,911 | B2 * | 11/2010 | Sano et al. ............... 345/173 |
| 2008/0029292 | A1 | 2/2008 | Takayama et al. |
| 2009/0153503 | A1 | 6/2009 | Jiang et al. |
| 2009/0153514 | A1 | 6/2009 | Jiang et al. |
| 2009/0160798 | A1 | 6/2009 | Jiang et al. |
| 2011/0211135 | A1 * | 9/2011 | Sharp et al. ............... 349/15 |
| 2011/0285661 | A1 * | 11/2011 | Hotelling ............... 345/174 |

FOREIGN PATENT DOCUMENTS

| CN | 201097040 Y | 8/2008 |
| CN | 101286107 A | 10/2008 |
| CN | 201218888 Y | 4/2009 |
| CN | 201233481 Y | 5/2009 |
| CN | 101458593 A | 6/2009 |
| CN | 101458603 A | 6/2009 |
| CN | 101464765 A | 6/2009 |
| CN | 101587410 A | 11/2009 |

OTHER PUBLICATIONS

Kazuhiro Noda, Kohtaro Tanimura, Production of Transparent Conductive Films with Inserted SiO2 Anchor Layer, and Application to a Resistive Touch Panel, Electronics and Communications in Japan, No. 7, 2001, p. 39-45, vol. 84.

Li Shuben, Wang Qindi, Ji Jianhua, Study of Continuous Coating Capacitive Touch Panels, Optoelectronic Technology in China, vol. 15, No. 1, Mar. 1995, p. 62-67.

* cited by examiner

*Primary Examiner* — Jennifer Doan
(74) *Attorney, Agent, or Firm* — Altis Law Group, Inc.

(57) ABSTRACT

A liquid crystal display screen includes a resistance-type touch panel and a liquid crystal display panel. The touch panel includes a first electrode plate and a second electrode plate opposite to the first electrode plate. The first electrode plate includes a first substrate and a first transparent conductive layer located on the first substrate. The second electrode plate includes a common substrate and a second transparent conductive layer. The liquid crystal display panel includes an upper optical polarizer, an upper substrate, an upper electrode, an upper alignment layer, a liquid crystal layer, a lower alignment layer, a thin film transistor panel, and a lower optical polarizer, from top to bottom in sequence. The upper substrate is the same with the common substrate. The upper optical polarizer is sandwiched between the second transparent conductive layer and the common substrate.

20 Claims, 8 Drawing Sheets

LIQUID CRYSTAL DISPLAY SCREEN

RELATED APPLICATIONS

This application claims all benefits accruing under 35 U.S.C. §119 from China Patent Application No. 201010189984.4, filed on Jun. 2, 2010 in the China Intellectual Property Office, the disclosure of which is incorporated herein by reference.

BACKGROUND

1. Technical Field

The present disclosure relates to liquid crystal display screens and, in particular, to a liquid crystal display screen having a touch panel.

2. Discussion of Related Art

A liquid crystal display equipped with a resistance-type touch panel includes a resistance-type touch panel, an upper optical polarizer, an upper substrate, an upper alignment layer, a liquid crystal layer, a lower alignment layer, a thin-film transistor panel, and a lower optical polarizer in sequence. The resistance-type touch panel includes a first electrode plate, a second electrode plate, and a plurality of dot spacers located between the first electrode plate and the second electrode plate. The first electrode plate includes a first substrate and a first transparent conductive layer located on the first substrate. The second electrode plate includes a second substrate and a second transparent conducive layer located on the second substrate. The second transparent conductive layer faces the first transparent conductive layer.

However, the resistance-type touch panel equipped in the liquid crystal display can increase a thickness of the liquid crystal display. Thus, a structure of the liquid crystal display can be complicated.

What is needed, therefore, is to provide a liquid crystal display screen, to overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
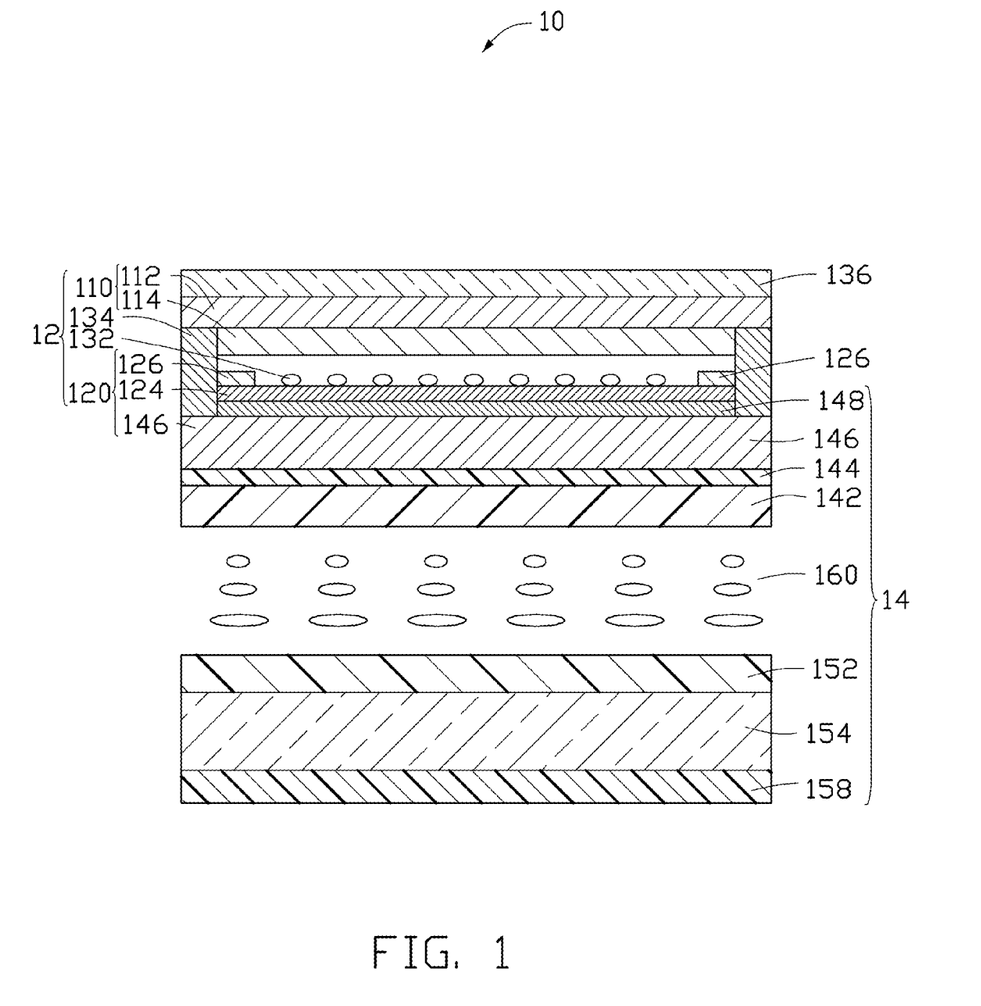
FIG. 1 is a cross sectional view of one embodiment of a liquid crystal display screen.

Referring to FIG. 1, one embodiment of a liquid crystal display screen 10 is provided. The liquid crystal display screen 10 can include a resistance-type touch panel 12 and a liquid crystal display panel 14.

The touch panel 12 can be a four-line resistance-type touch panel, a five-line resistance-type touch panel, a seven-line resistance-type touch panel, or an eight-line resistance-type touch panel.

Figure 2:
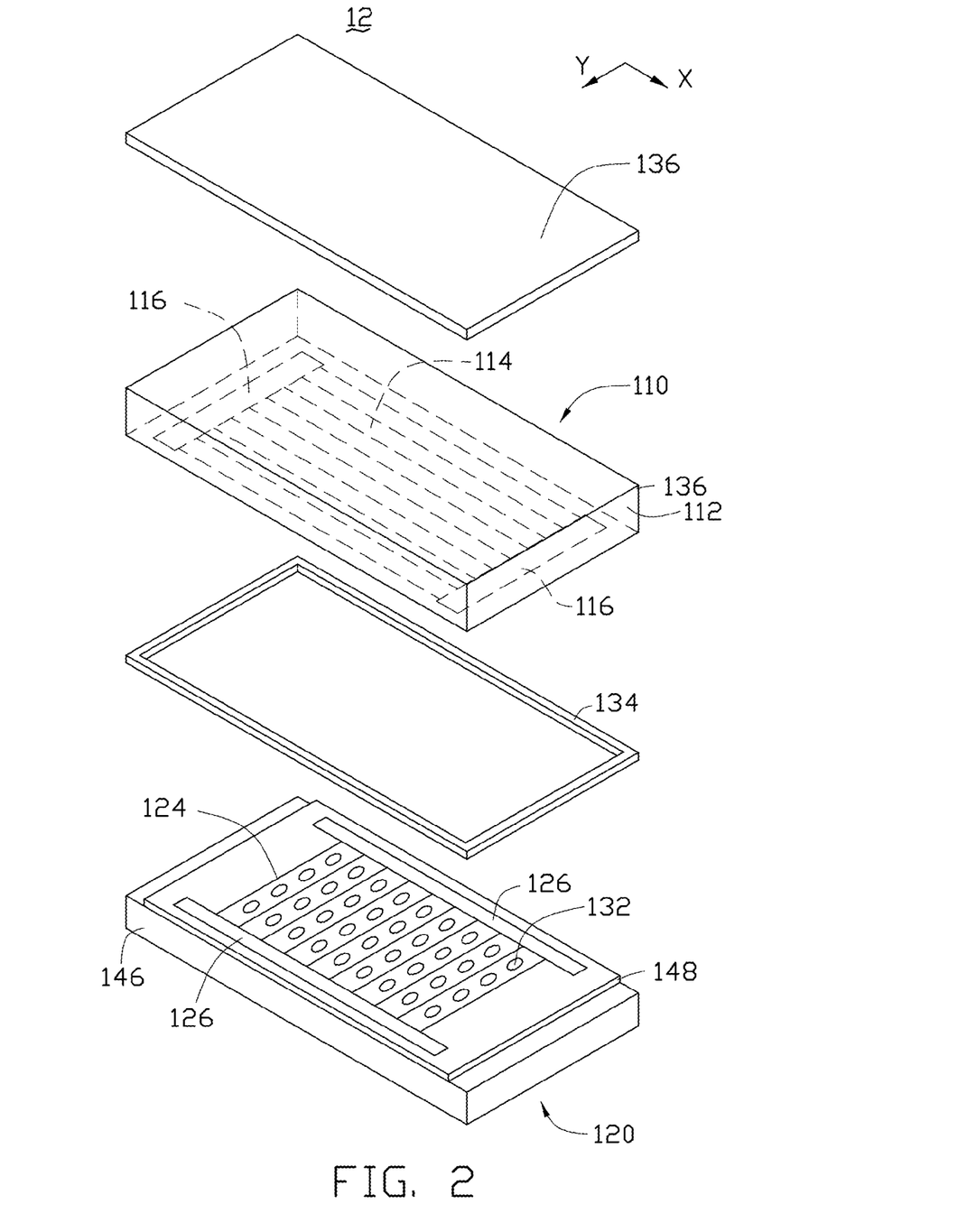
FIG. 2 is an exploded, isometric view of the liquid crystal display screen shown in FIG. 1.

Referring to FIG. 2, one embodiment of the touch panel 12 is the four-line resistance-type touch panel. The touch panel 12 includes a first electrode plate 110, a second electrode plate 120 facing the first electrode plate 110, a plurality of dot spacers 132, an insulated frame 134, and a protective layer 136. The dot spacers 132 and the insulated layer 134 are disposed between the first electrode plate 110 and the second electrode plate 120. The protective layer 136 is located on an upper surface of the first electrode plate 110.

The first electrode plate 110 includes a first substrate 112, a first transparent conductive layer 114 located on the first substrate 112, and two first electrodes 116 electrically connected to the first transparent conductive layer 114. In one embodiment, the first transparent conductive layer 114 and two first electrodes 116 are located on a lower surface of the first substrate 112. The two first electrodes 116 are separately disposed on two ends of the first transparent conductive layer 114 and aligned along an X axis, and electrically connected to the first transparent conductive layer 114. In this connection, the term "upper," "top," "lower," and "bottom" only indicate relative position or direction.

The second electrode plate 120 includes a common substrate 146, a second transparent conductive layer 124 disposed on the common substrate 146, and two second electrodes 126 electrically connected to the second transparent conductive layer 124. In one embodiment, the second transparent conductive layer 124 and the two second electrodes 126 are located on an upper surface of the common substrate 122. The second transparent conductive layer 124 faces the first transparent conductive layer 114. The two second electrodes 126 are separately disposed on the two ends of the second transparent conductive layer 124 and aligned along a Y axis intersected with the X axis, and electrically connected to the second transparent conductive layer 124. In one embodiment, the X axis is substantially perpendicular to the Y axis.

The liquid crystal display panel 14 from top to bottom, can include an upper optical polarizer 148, the common substrate 146, an upper electrode 144, an upper alignment layer 142, a liquid crystal layer 160, a lower alignment layer 152, a thin film transistor panel 154, and a lower optical polarizer 158. The upper polarizer 148 is sandwiched between the second transparent conductive layer 124 and the common substrate 146. It can be understood that a desired layer can be inserted between two adjacent above-mentioned layers of the liquid crystal display screen 10, according to need.

Thus, in the liquid crystal display screen 10, the common substrate 146 is simultaneously used by the touch panel 12 and the liquid crystal display panel 14. The common substrate 146 can be the only second substrate configured to support the second electrode plate 120, and can also be the only upper substrate of the liquid crystal display panel 14. The upper substrate of the liquid crystal display panel 14 can be omitted. Thus, a thickness of the liquid crystal display screen 10 can be decreased, a structure of the liquid crystal display screen 10 can be simplified, and the process of fabricating the liquid crystal display screen 10 can be simplified. The cost of the liquid crystal display screen 10 can be reduced. The liquid crystal display screen 10 can also improve utilization efficiency of a backlight module, further improving display quality.

Specifically, the common substrate 146 is a transparent plate, and can be made of glass, diamond, quartz, plastic, or resin. The thickness of the common substrate 146 can be in a range from about 1 millimeter to about 1 centimeter. In one embodiment, the common substrate 146 is made of glass and has a thickness of about 5 millimeters.

The first substrate 112 can be a transparent and flexible film or a transparent and flexible plate. The first substrate 112 can be made of glass, diamond, quartz, or any other suitable rigid material. If the touch panel 12 is a flexible touch panel, the first substrate 112 can be made of plastic, resin, or any other suitable flexible material, such as polycarbonate (PC), polymethyl methacrylate acrylic (PMMA), polyethylene terephthalate (PET), polyether polysulfones (PES), polyvinyl polychloride (PVC), benzocyclobutenes (BCB), polyesters or acrylic resins. A thickness of the first substrate 112 can be in a range from about 1 millimeter to about 1 centimeter. In one embodiment, the first substrate 112 is made of polyethylene terephthalate (PET).

In the touch panel 12, at least one of the first transparent conductive layer 114 and the second transparent conductive layer 124 is an anisotropic conductive layer. A ratio between a resistivity of the anisotropic conductive layer along a direction and resistivities of the carbon nanotube layer along other directions is less than or equal to 1 to 2. The anisotropic conductive layer is a carbon nanotube layer with a certain transparency. If one of the first transparent conductive layer 114 and the second transparent conductive layer 124 is the carbon nanotube layer, the other one can be an indium tin oxide (ITO) layer, an antimony tin oxide (ATO) layer, or other material layer.

The carbon nanotube layer includes a plurality of carbon nanotubes extending substantially along a same direction. Thus, the resistant conductivity of the carbon nanotube layer along the extending direction can be less than the resistant conductivities of the carbon nanotube layer along other directions. The extending direction is substantially parallel to a surface of the carbon nanotube layer. In one embodiment, a resistant conductivity ratio of the resistant conductivity of the carbon nanotube layer along the extending direction and the resistant conductivity of the carbon nanotube layer along other directions are less than 1 to 2. The carbon nanotube layer includes at least one carbon nanotube film. In one embodiment, the carbon nanotube layer includes a plurality of carbon nanotube films stacked over each other or substantially parallel to each other, and nearly without spaces therebetween. Most carbon nanotubes in the plurality of carbon nanotube films are substantially arranged along a same direction, that is, the carbon nanotubes in two adjacent carbon nanotube films are substantially arranged along the same direction. In one embodiment, the transparent conductive layer 114 consists of a single carbon nanotube film. The transparency of the single carbon nanotube film can be greater than or equal to 85%. The thickness of the carbon nanotube layer can be from about 0.5 nanometers to about 100 micrometers. In one embodiment, the thickness of the carbon nanotube layer is from about 100 nanometers to about 200 nanometers.

Figure 3:
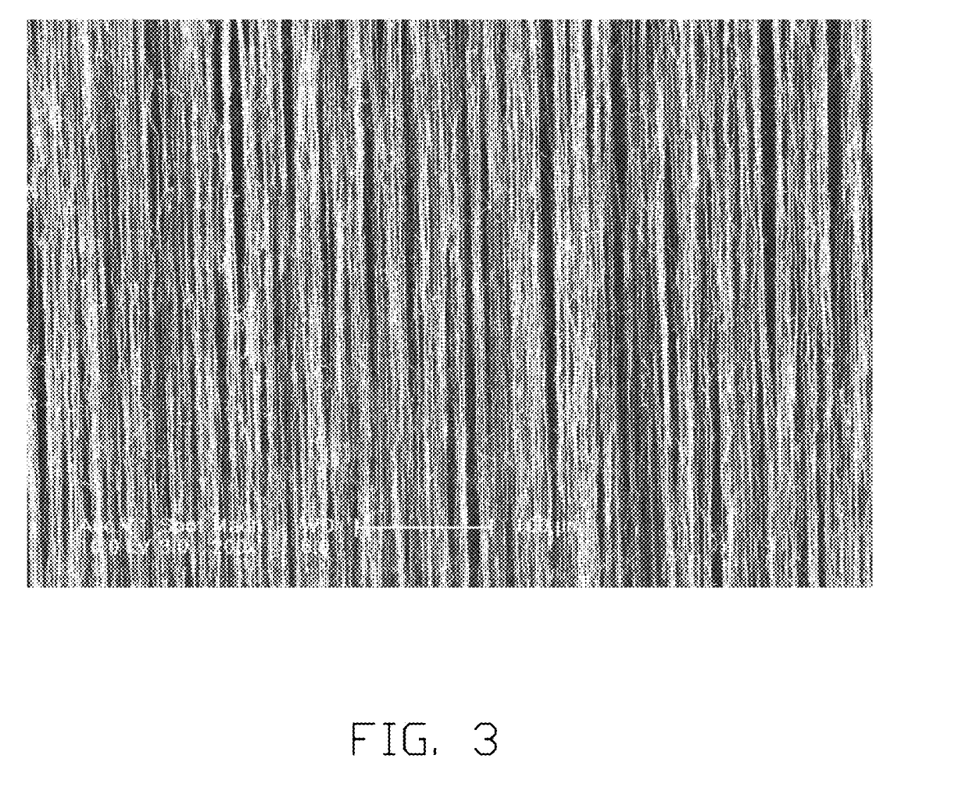
FIG. 3 shows a Scanning Electron Microscope (SEM) image of a carbon nanotube film applied in the liquid crystal display screen shown in FIG. 1.

Referring to FIG. 3, in the carbon nanotube film, the carbon nanotubes are substantially oriented along a same preferred orientation and approximately parallel to each other. In this connection, the term "approximately" or "substantially" as used herein means that it is impossible and unnecessary that each of the carbon nanotubes in the carbon nanotube films be exactly parallel to one another, because in the course of fabricating the carbon nanotube film, some factor such as the change of drawing speed and non-uniform drawing force on the carbon nanotube film when the carbon nanotube film is drawn from a carbon nanotube array affects the orientations of the carbon nanotubes. A film can be drawn from a carbon nanotube array, to form the ordered carbon nanotube film, namely a carbon nanotube film. Examples of carbon nanotube film are taught by U.S. Pat. No. 7,045,108 to Jiang et al. The carbon nanotube film includes a plurality of successive and oriented carbon nanotubes joined end-to-end by van der Waals attractive force therebetween. The carbon nanotube film is a free-standing film. The carbon nanotube film can be treated with an organic solvent to increase the mechanical strength and toughness of the carbon nanotube film and reduce the coefficient of friction of the carbon nanotube film. A thickness of the carbon nanotube film can range from about 0.5 nm to about 100 μm.

A method of making a carbon nanotube film includes providing an array of carbon nanotubes and pulling out a carbon nanotube film from the array of carbon nanotubes. Pulling can be aided by the use of a tool such as adhesive tape, pliers, tweezers, or other tools allowing multiple carbon nanotubes to be gripped and pulled simultaneously. The carbon nanotube film can be formed by selecting one or more carbon nanotubes having a predetermined width from the array of carbon nanotubes and pulling the carbon nanotubes at a substantially uniform speed to form carbon nanotube segments that are joined end to end to achieve a uniform carbon nanotube film.

The carbon nanotube segments can be selected by using the tool allowing multiple carbon nanotubes to be gripped and pulled simultaneously to contact the array of carbon nanotubes. The pulling direction can be substantially perpendicular to the growing direction of the array of carbon nanotubes.

More specifically, during the pulling process, as the initial carbon nanotube segments are drawn out, other carbon nanotube segments are also drawn out end to end due to van der Waals attractive force between ends of adjacent segments. This process of pulling produces a substantially continuous and uniform carbon nanotube film having a predetermined width. If the angle between the aligned directions of the carbon nanotubes in adjacent carbon nanotube films is larger than 0 degrees, a microporous structure is defined by the carbon nanotubes. The carbon nanotube structure in an embodiment employing these films will have a plurality of micropores. The micropores have diameters which can range from about 1 nm to about 0.5 mm. Stacking the carbon nanotube films will also add to the structural integrity of the carbon nanotube structure.

Understandably, the carbon nanotube film structure may further include at least two stacked carbon nanotube films. Additionally, when the carbon nanotubes in the carbon nanotube film are aligned along one preferred orientation (e.g., the carbon nanotube film), an angle can exist between the orientation of carbon nanotubes in adjacent films. Adjacent carbon nanotube films can be combined by only the van der Waals attractive force therebetween. The number of the layers of the carbon nanotube films is not limited as long as the carbon nanotube structure. However, the thicker the carbon nanotube structure, the smaller the specific surface area.

The carbon nanotube layer can include a reinforcement material and the at least one above mentioned carbon nanotube film. The reinforcement material is substantially uniformly infiltrated on the at least one carbon nanotube to form a carbon nanotube composite film. The reinforcement material can be a transparent polymer material or metal. The transparent polymer material can be polycarbonate (PC), polymethyl methacrylate acrylic (PMMA), polyethylene terephthalate (PET), benzocyclobutenes (BCB), polystyrene, polyethylene, polycarbonate, polycycloolefins, and any other suitable materials. The metal can be nickel, gold, platinum, iron, cobalt, copper, or any other suitable materials.

It can be understood the carbon nanotube layer can be treated with a laser to form a plurality of laser cutting lines. Thus, the resistivity of the carbon nanotube layer can be improved.

In one embodiment, both of the first and second transparent conductive layers 114, 124 are each a single layer of the above mentioned carbon nanotube film including a plurality of carbon nanotubes. Because the carbon nanotubes in the carbon nanotube film have a high purity and a high specific surface area, the carbon nanotube film is adhesive. As such, the carbon nanotube film can be directly adhered to the upper surface of the upper polarizer 148. Thus, the second transparent conductive layer 124 can be disposed on the upper surface of the upper polarizer 148 only by van der Waals force. It should be noted that the second transparent conductive layer can be also adhered to the upper polarizer 148 by transparent optical adhesive or UV adhesive. The carbon nanotubes in the first transparent conductive layer are substantially arranged along the X axis, and the carbon nanotubes in the second transparent conductive layer are substantially oriented along the Y axis.

The two first electrodes 116 and the two second electrodes 126 are made of electrically conductive materials, such as metal, conductive polymer, carbon nanotubes, or any other electrically conductive materials. In one embodiment, the materials of the two first electrodes 115 and the two second electrodes 116 are silver paste.

The transparent dot spacers 132 are separately located on the second transparent conductive layer 134. The insulated frame 134 is mounted between the lower surface of the first substrate 112 and the upper surface of the common substrate 146. The transparent dot spacers 132 and the insulated frame 134 can be made of, for example, insulated resin or any other suitable insulated material. Insulation between the first electrode plate 110 and the second electrode plate 120 can be provided by the transparent dot spacers 132 and the insulated frame 134. It is to be understood that the transparent dot spacers 132 are optional, particularly if the touch panel 10 is relatively small. They serve as supports given the size of the span and the strength of the first electrode plate 110.

The protective layer 136 is located on the top surface of the first substrate 112. The material of the protective layer 136 can be a transparent material, such as silicon nitrides, silicon dioxides, benzocyclobutenes, polyester films, or polyethylene terephthalates. In one embodiment, the protective layer 136 can be made of slick plastic and receive a surface hardening treatment to protect the first electrode plate 110 from being scratched when in use.

The upper optical polarizer 148 and the lower optical polarizer 158 can be made of dichroic/dichromatic material. The thickness of the upper optical polarizer 148 and lower optical polarizer 158 can range from about 1 micron to 0.5 millimeters. The upper optical polarizer 148 and lower optical polarizer 158 polarize the light emitted from a back-light unit (not shown) disposed under the liquid crystal display screen 10. A polarizing direction of the lower optical polarizer 158 is substantially perpendicular or substantially parallel to a polarizing direction of the upper optical polarizer 148. In one embodiment, the upper optical polarizer 148 and lower optical polarizer 158 can be dichromatic polyvinyl alcohol, and the polarizing direction of the lower optical polarizer 158 is substantially perpendicular to that of the upper optical polarizer 148.

The upper electrode 144 can cooperate with a lower electrode (i.e., the pixel electrode) to apply a voltage on the liquid crystal layer 160 located between the upper electrode 144 and the lower electrode. A material of the upper electrode 144 can be indium tin oxide (ITO) or other transparent conductive materials.

A lower surface of the upper alignment layer 142 is adjacent to the liquid crystal layer 160. The lower surface of the upper alignment layer 142 can define a plurality of substantially parallel straight upper grooves (not shown). The lower alignment layer 152 can include a plurality of substantially parallel straight lower grooves (not shown). A length direction of the lower grooves is substantially perpendicular to a length direction of the upper grooves. The upper and lower grooves align the orientation of liquid crystal molecules of the liquid crystal layer 160. Materials of the upper and lower alignment layers 142, 152 can be polystyrene and its derivatives, polyimide, polyvinyl alcohol, polyester, epoxy resin, polyurethane, polysilane, and other suitable materials. The upper and lower grooves can be made by a scratching method, a SiOx-depositing method, or a micro grooves treating method. In one embodiment, the upper and lower alignment layers 142, 152 is made of polyurethane and has a thickness of about 1 micron to about 50 microns.

A thickness of the liquid crystal layer 160 can be about 1 micron to about 50 microns. In one embodiment, the thickness of the liquid crystal layer 160 is about 5 microns. The liquid crystal layer 160 includes a plurality of cigar shaped liquid crystal molecules. Understandably, the liquid crystal layer 160 can also be made of other suitable materials. The liquid crystal molecules can vary along aligned directions thereof under different electrical fields.

The thin film transistor panel 154 includes a lower substrate (not shown), a plurality of thin film transistors (not shown) formed on the lower substrate, a plurality of pixel electrodes (not shown), a plurality of source lines (not shown), and a plurality of gate lines (not shown). The plurality of thin film transistors correspond to the plurality of pixels one by one. Each of the thin film transistors electrically connects to the drive circuit through one of the source lines and one of the gate lines. In one embodiment, the thin film transistors and the pixel electrodes are aligned on the lower substrate.

Figure 4:
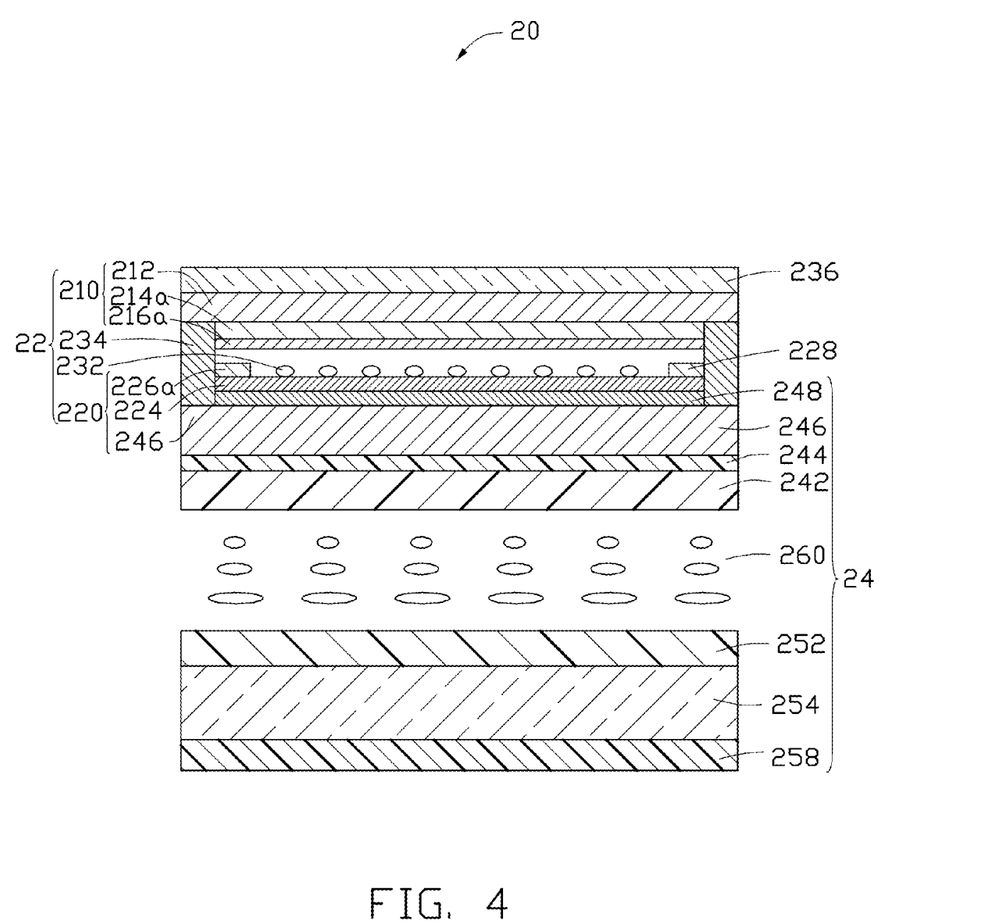
FIG. 4 is a cross sectional view of another embodiment of a liquid crystal display screen including a first electrode plate and a second electrode plate.

Referring to FIG. 4, one embodiment of a liquid crystal display screen 20 is disclosed. The liquid crystal display screen 20 includes a resistance-type touch panel 22 and a liquid crystal display panel 24. The touch panel 22 includes a first electrode plate 210, a second electrode plate 220 facing the first electrode plate 210, a plurality of dot spacers 232, an insulated frame 234, and a protective layer 236. The dot spacers 232 and the insulated layer 234 are disposed between the first electrode plate 210 and the second electrode plate 220. The protective layer 236 is located on an upper surface of the first electrode plate 210. The liquid crystal display panel 24, from top to bottom, can include an upper optical polarizer 248, a common substrate 246, an upper electrode 244, an upper alignment layer 242, a liquid crystal layer 260, a lower alignment layer 252, a thin film transistor panel 254 and a lower optical polarizer 258. The upper optical polarizer 248 can be completely inserted in the second electrode plate 220.

The liquid crystal display screen 20 is similar to the liquid crystal display screen 10, except that the touch panel 22 is a multi-touch resistance-type type touch panel.

Figure 5:
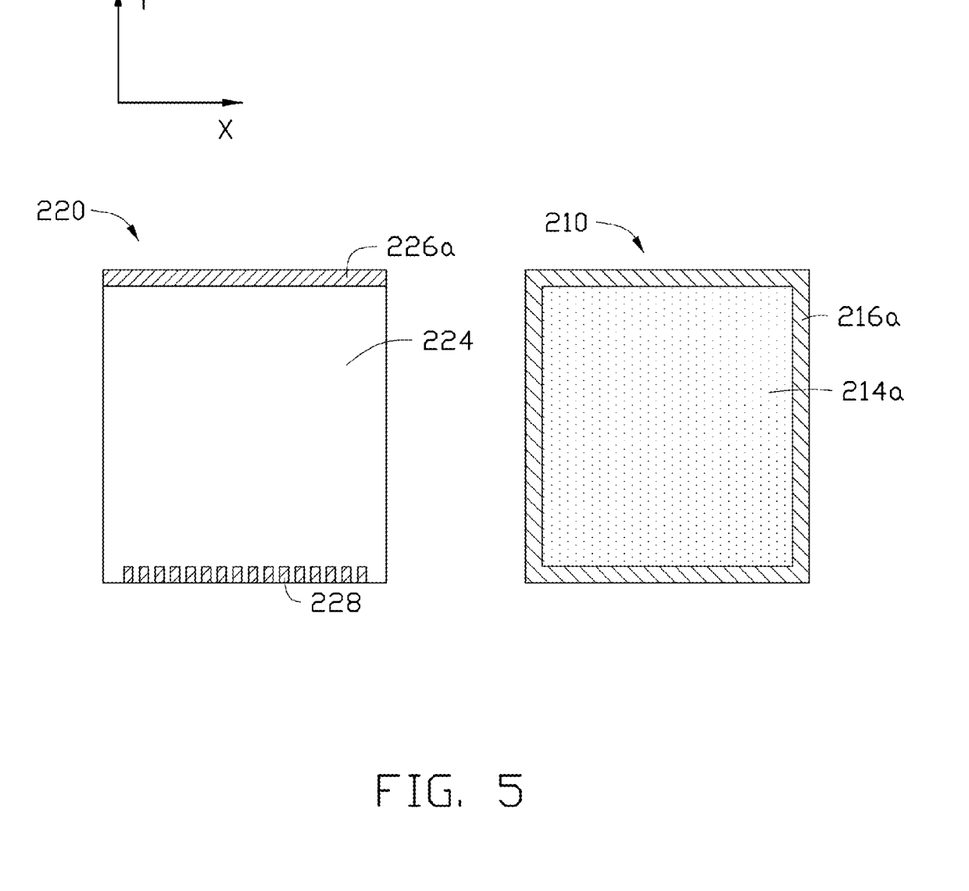
FIG. 5 is a top view of one embodiment of the first and second electrode plates shown in FIG. 4.

Referring to FIG. 5, one embodiment of the first and second electrode plates 210, 220 is disclosed. The first electrode plate 210 includes a first substrate 212, a first transparent conductive layer 214a disposed under the lower surface of the first substrate 212, and a first electrode 216a electrically connected to the first transparent conductive layer 214a. The first transparent conductive layer 214a can be a rectangular ITO film. The first electrode 216a are disposed the periphery of the first transparent conductive layer 214a. The material of the first electrode 216a is the same as that of the first electrodes 116 in the touch panel 12. In one embodiment, the first electrode 216a is formed by printing a conductive silver paste on the periphery of the first transparent conductive layer 214a.

The second electrode 220 can include the common substrate 246, a second transparent conductive layer 224, a second electrode 226a, and a plurality of third electrodes 228. The upper optical polarizer 248 is sandwiched between the common substrate 246 and the second transparent conductive layer 224, and is covered by the second transparent conductive layer 224. The second transparent conductive layer 224 is located on the upper surface of the upper optical polarizer 248. The second electrode 226a and third electrodes 228 are electrically connected to the second conductive layer 224.

The second transparent conductive layer 224 is an anisotropic conductive layer. Specifically, the second transparent conductive layer 224 has a larger resistivity along an X axis than along a Y axis intersected with the X axis. In one embodiment, the second transparent conductive layer 224 can be a single carbon nanotube film including a plurality of carbon nanotubes. Carbon nanotubes of the carbon nanotube film can be substantially arranged along the Y axis, so that the carbon nanotube film has a greater electrical conductivity along the Y axis than along other directions. Alternatively, most of the carbon nanotubes substantially extend along the Y axis. The resistivity of the carbon nanotube film along the Y axis can be less than the resistivities of the carbon nanotube film along other directions. In one embodiment, the resistivity of the second transparent conductive layer 224 along the X axis is about 10 times greater than along the Y axis.

The second electrode 226a can be a strip-shaped electrode and located on a side of the second transparent conductive layer 224 and extend along the X axis. In one embodiment, the second electrode 226a can be substantially perpendicular to the Y axis, that is, the extending direction of the second electrode 226a is substantially perpendicular to the extending directions of the carbon nanotubes in the second transparent conductive layer 224. The material of the second electrode 226a is the same as that of the first electrodes 116 in the touch panel 12. In one embodiment, the first electrode 226a is formed by printing conductive silver paste on the second transparent conductive layer 224.

The third electrodes 228 are separately located on another side of the second transparent conductive layer 224 opposite to the second electrode 226a. Each third electrode 228 is electrically connected to the second transparent conductive layer 224. The second transparent conductive layer 224 is the anisotropic conductive layer, thus, the third electrodes 228 are a plurality of strip-shaped conductive roads defined in the second transparent conductive layer 224. The material of the first electrode 226a can be the same as that of the first electrodes 116 in the touch panel 12. In one embodiment, the third electrodes 228 are formed by printing conductive silver paste on the side of the second transparent conductive layer 224.

When a user touches the touch panel 22 shown in FIGS. 4 and 5, the first electrode 216a is grounded, thus an electric potential of the first transparent conductive layer 214a is about 0 V. A steady direct current (DC) voltage is applied to the second electrode 226a, such as about 10 V, thus about 10V is applied to the second transparent conductive layer 224. The third electrodes 228 can detect the voltages at different measuring points of the second transparent conductive layer 224 to provide location data of the user's touch. The second electrode 226s serves as an input terminal, while each of the third electrodes 228 serves as an output terminal.

Figure 6:
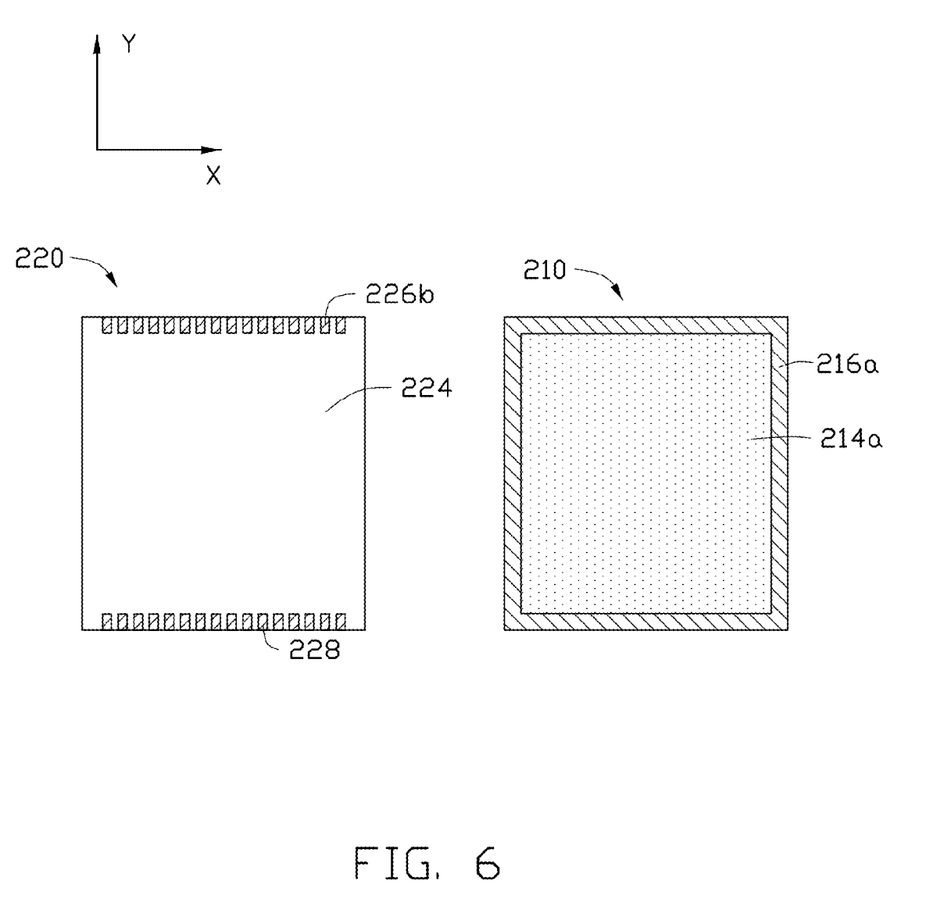
FIG. 6 is a top view of another embodiment of the first and second electrode plates shown in FIG. 4.

Referring to FIG. 6, another embodiment of the first and second electrode plates 210, 220 is disclosed. The second electrode plate 220 can include the second transparent conductive layer 224, a plurality of second electrodes 226b, and a plurality of third electrodes 228. The second transparent conductive layer 224 has two opposite sides substantially parallel to the X axis. The second and third electrodes 226b, 228 are uniformly and separately disposed on the two opposite sides of the second transparent conductive layer 224, respectively. Namely, the second and third electrodes 226b, 228 are juxtaposed along a direction substantially perpendicular to the extending direction of carbon nanotubes in the second transparent conductive layer 224. The second electrodes 226b are aligned with the third electrodes 228. The structure of the first electrode plate 210 is the same as that of the first electrode plate 210 shown in FIG. 5.

When a user touches the touch panel 22 shown in FIGS. 4 and 6, the second and third electrodes 226b, 228 serve not only as input terminals, but also as output terminals. If a steady DC voltage is applied to the second electrodes 226b, the third electrodes 228 serve as the output terminal. If a steady DC voltage is applied to the third electrodes 228 configured as the input terminal, the second electrodes 226b serve as the output terminal. Therefore, the location of the user's touch can be more precisely determined by the touch panel 22 shown in FIGS. 4 and 6 than by the touch panel 22 shown in FIGS. 4 and 5 if such precision is needed.

Figure 7:
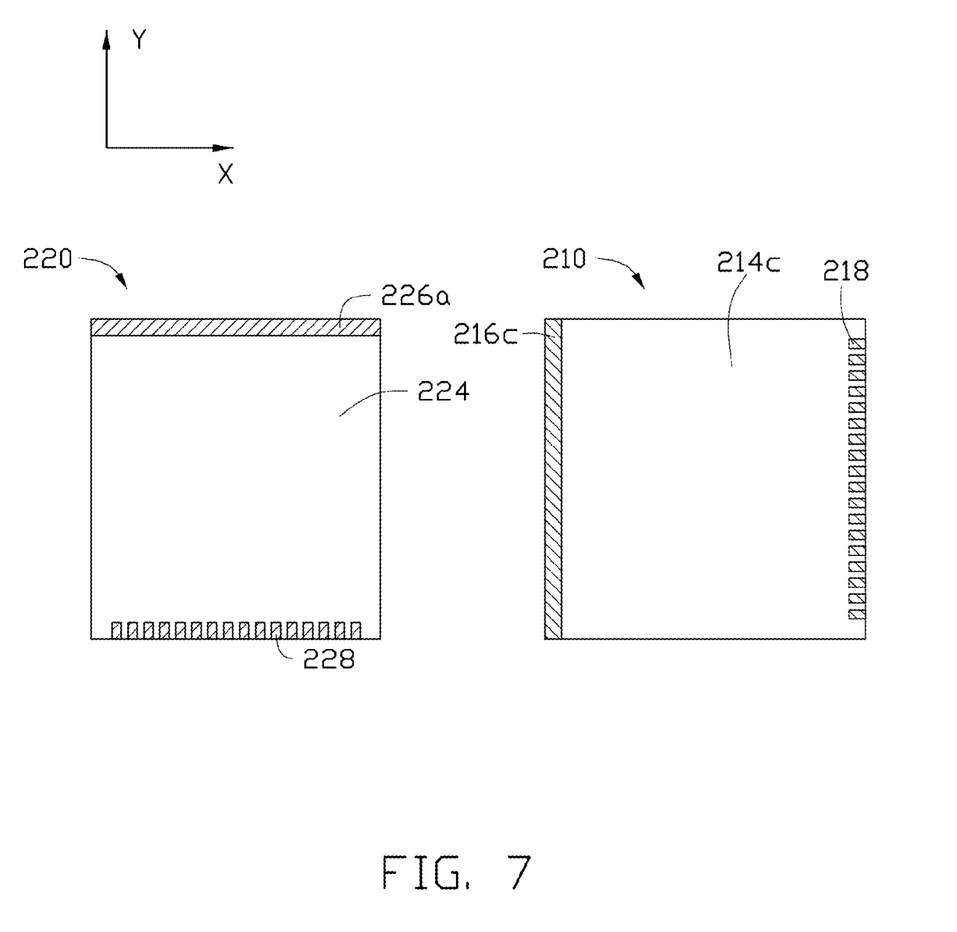
FIG. 7 is a top view of yet another embodiment of the first and second electrode plates shown in FIG. 4

Referring to FIG. 7, yet another embodiment of the first and second electrode plates 210, 220 is disclosed. The structure of the first electrode plate 210 shown in FIG. 7 is similar to the structure of the second plate 220 shown in FIG. 5. In the embodiment, the first electrode plate 210 can include a first transparent conductive layer 214c composed of a single carbon nanotube film, a strip-shaped first electrode 216c, and a plurality of separate fourth electrodes 218. Specifically, the single carbon nanotube film includes a plurality of carbon nanotubes substantially extending along the X axis. The first electrode 216c is located on the side of the first transparent conductive layer 214c and extends along a direction substantially perpendicular to the extending direction of the carbon nanotubes in the first transparent conductive layer 214c. The first electrode 216c extends along the direction substantially perpendicular to the X axis. The fourth electrodes 218 are disposed on the other side of the first transparent conductive layer 214c opposite to the first electrode 216c. The fourth electrodes 218 are separated from the first electrode 216c. The resistivity of the first transparent conductive layer 214c along the Y axis is greater than that along the X axis. The structure of the second electrode plate 220 can be the same as that of the second electrode plate 220 shown in FIG. 5.

When a user touches the touch panel 22 shown in FIGS. 4 and 7, if the first electrode 216c and/or the four electrodes 218 is grounded, and a voltage is applied to the second electrodes 226a, such as about 10 V, the voltages of the third electrodes 228 can be detected to determine the location of the user's touch along the X axis. If the second electrodes 226a and/or the third electrodes 228 are grounded, and a steady DC voltage is applied to the first electrode 216c, such as about 10 V, the voltages of the fourth electrode 218 can be detected to determine the location of the user's touch in the Y axis.

In addition, the location of the user's touch on the touch panel 22 can also be detected by the following method. The fourth electrodes 218 and third electrodes 228 can be scanned in sequence, and their voltages measured. Simultaneously, a fixed voltage, such as about 5V, about 10V, or about 0V, is applied to the first electrode 216c and second electrode 226a at non-measuring points. Thus, the fourth electrodes 218 at non-measuring points or the third electrodes 228 at non-measuring points receive a steady voltage, and an adverse effect on the measuring point caused by the non measuring points can be eliminated. Therefore, using the touch panel 22 shown in FIGS. 4 and 7, improves the accuracy of the measured voltage at the measuring point being measured.

Figure 8:
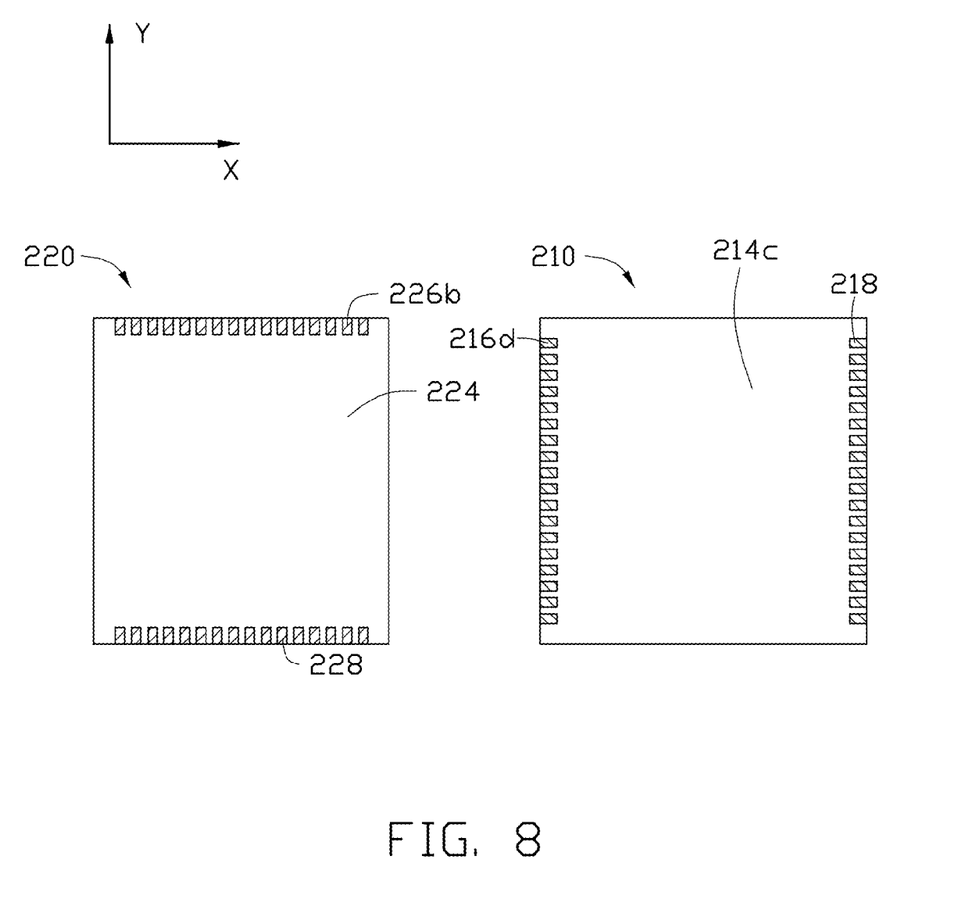
FIG. 8 is a top view of still another embodiment of the first and second electrode plates shown in FIG. 4.

Referring to FIG. 8, still another embodiment of the first and second electrode plates 210, 220 is provided. The first electrode plate 210 can include a first transparent conductive layer 214c, a plurality of first electrodes 216d, and a plurality of fourth electrodes 218. The first transparent conductive layer 214c is an anisotropic conductive layer. Specifically, the first transparent conductive layer 214c is a single carbon nanotube film including a plurality of carbon nanotubes substantially extending along the X axis. The resistivity of the first transparent conductive layer 214c along the X axis is less than along any other directions. The first and fourth electrodes 216c, 218 are arranged along the Y axis and located at the two sides of the first transparent conductive layer 214c substantially parallel to the X axis, respectively. The first and fourth electrodes 216c, 218 are electrically connected to the first transparent conductive layer 214c. The structure of the second electrode plate 220 in the embodiment is the same as that of the second electrode plate 220 shown in FIG. 6.

When a user touches the touch panel 22 shown in FIGS. 4 and 8, if the first and fourth electrodes 216d, 218 are simultaneously grounded, and a voltage is alternately applied to the second electrodes 226d and the third electrodes 228, voltages of the third electrodes 228 opposite to the second electrodes 226d or voltages of the second electrodes 226d opposite to the third electrodes 228 can be measured to determine the location of the user's touch in the X axis. If the second electrodes 226b and the third electrodes 228 are simultaneously grounded, and a voltage is alternately applied to the first electrodes 216c and the fourth electrodes 218, voltages of the fourth electrodes 218 opposite to the first electrodes 216c or voltages of the first electrodes 216c opposite to the fourth electrodes 218 can be detected to determine the location of the user's touch in the Y axis.

According to the above descriptions, in the liquid crystal display screens, the touch panels and the liquid crystal display panels cooperatively use a common substrate. Thus, the liquid crystal display screens can omit one element and still maintain the same functions. The structures of the liquid crystal display screens can be simplified. The thicknesses of the liquid crystal display screens can be decreased. The utilization efficiencies of the liquid crystal display screens can be improved, and a quality of the liquid crystal display screens can also be improved.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A liquid crystal display screen, comprising:
   a resistance-type touch panel comprising a first electrode plate and a second electrode plate, the first electrode plate comprising a first substrate and a first transparent conductive layer located on a lower surface of the first substrate, the second electrode plate comprising a common substrate and a second transparent conductive layer located on an upper surface of the common substrate, at least one of the first transparent conductive layer and the second transparent conductive layer being an anisotropic conductive layer; and
   a liquid crystal display panel comprising an upper optical polarizer, an upper substrate, an upper electrode, an upper alignment layer, a liquid crystal layer, a lower alignment layer, a thin film transistor panel, and a lower optical polarizer, wherein the upper substrate is the same with the common substrate, the upper optical polarizer is sandwiched between the second transparent conductive layer and the common substrate.

2. The liquid crystal display screen of claim 1, wherein the anisotropic conductive layer is a carbon nanotube layer comprising a plurality of carbon nanotubes substantially extending along a first direction.

3. The liquid crystal display screen of claim 2, wherein adjacent carbon nanotubes of the plurality carbon nanotubes substantially extending along the first direction are joined end-to-end via van der Waals force.

4. The liquid crystal display screen of claim 3, wherein a resistivity of the carbon nanotube layer along the first direction is less than resistivities of the carbon nanotube layer along other directions.

5. The liquid crystal display screen of claim 4, wherein a resistivity ratio between the resistivity of the carbon nanotube layer along the first direction and the resistivity of the carbon nanotube layer along a second direction substantially perpendicular to the first direction is less than or equal to 1:2.

6. The liquid crystal display screen of claim 5, wherein the carbon nanotube layer and the upper optical polarizer are combined only by van der Waals force.

7. The liquid crystal display screen of claim 5, wherein the carbon nanotube layer and the upper optical polarizer are combined by a transparent optical adhesive or UV adhesive.

8. The liquid crystal display screen of claim 5, wherein the first electrode plate further comprises a first electrode continuously located on a periphery of the first transparent conductive layer and electrically connected to the first transparent conductive layer; the second electrode plate further comprises a second electrode located on a first side of the second transparent conductive layer, and a plurality of third electrodes separately arranged at a second side of the second transparent conductive layer; the second electrode and the third electrodes are electrically connected to the second transparent conductive layer, the first side and the second side are opposite to each other and are substantially parallel to the second direction, the second transparent conductive layer is the carbon nanotube layer comprising a plurality of carbon nanotubes substantially extending along the second direction.

9. The liquid crystal display screen of claim 5, wherein the first electrode plate further comprises a first electrode continuously located on a periphery of the first transparent conductive layer and electrically connected to the first transparent conductive layer; the second electrode plate further comprises a plurality of separately second electrodes separately arranged at a first side of the second transparent conductive layer, and a plurality of separately third electrodes separately arranged at a second side of the second transparent conductive layer; the second electrodes and the third electrodes are located on two opposite sides of the second transparent conductive layer and are electrically connected to the second transparent conductive layer; the first side and the second side are opposite to each other, and are substantially parallel to the second direction; the second transparent conductive layer is the carbon nanotube layer comprising a plurality of carbon nanotubes substantially extending along the second direction.

10. The liquid crystal display screen of claim 2, wherein the carbon nanotube layer further comprises a reinforcement material infiltrated in the plurality of carbon nanotubes.

11. The liquid crystal display screen of claim 2, wherein the carbon nanotube layer defines a plurality of cutting lines extending substantially parallel to the first direction.

12. The liquid crystal display screen of claim 1, wherein both of the first transparent conductive layer and the second transparent conductive layer are the anisotropic conductive layer comprising a plurality of carbon nanotubes, the carbon nanotubes in the first transparent conductive layer are substantially arranged along a first direction, the carbon nanotubes in the second transparent conductive layer are substantially arranged along a second direction substantially perpendicular to the first direction.

13. The liquid crystal display screen of claim 12, wherein the first electrode plate further comprises a plurality of first electrodes and a plurality of fourth electrodes; the first electrodes and the fourth electrodes are located on two opposite sides of the first transparent conductive layer and extend along the first direction; the second electrode plate further comprises a plurality of second electrodes and a plurality of third electrodes; the second electrodes and the third electrodes are located on two opposite sides of the second transparent conductive layer and extend along the second direction.

14. The liquid crystal display screen of claim 12, wherein the first electrode plate further comprises a first electrode, and a plurality of fourth electrodes; the first electrode is located on a first side of the first transparent conductive layer, and extends along the first direction; the fourth electrodes are separately arranged at a second side of the first transparent conductive layer opposite to the first side; the second electrode plate further comprises a plurality of second electrodes separately arranged at a third side of the second transparent conductive layer, and a plurality of third electrodes separately arranged at a fourth side of the second transparent conductive layer; the third side and the fourth side are opposite to each other and substantially parallel to the second direction.

15. The liquid crystal display screen of claim 1, wherein the common substrate comprises glass, diamond, quartz, plastic, or resin.

16. The liquid crystal display screen of claim 1, wherein the liquid crystal layer is located between the upper alignment layer and the lower alignment layer.

17. The liquid crystal display screen of claim 1, wherein the thin film transistor panel is sandwiched between the lower alignment layer and the lower optical polarizer.

18. A liquid crystal display screen, comprising:
a first substrate;
a first transparent conductive layer located on a lower surface of the first substrate;
a second transparent conductive layer separated from the first transparent conductive layer, an upper surface of the second transparent conductive layer oriented at a lower surface of the first transparent conductive layer;
an upper optical polarizer disposed on a lower surface of the second transparent conductive layer;
a common substrate attached to a lower surface of the upper optical polarizer such that the upper optical polarizer is sandwiched between the second transparent conductive layer and the common substrate;
an upper electrode positioned on a lower surface of the common substrate;
an upper alignment layer located on a lower surface of the upper electrode such that the upper electrode is located between the common substrate and the upper alignment layer;
a liquid crystal layer;
a lower alignment layer separated from the upper alignment layer, the liquid crystal layer sandwiched between the upper alignment layer and the lower alignment layer;
a thin film transistor panel located on a lower surface of the lower alignment layer; and
a lower optical polarizer positioned on a lower surface of the thin film transistor panel;
wherein at least one of the first transparent conductive layer and the second transparent conductive layer is an anisotropic conductive layer.

19. The liquid crystal display screen of claim 18, wherein the common substrate is shared by a touch panel and a liquid crystal display panel located on the touch panel; the touch panel comprises the first substrate, the first transparent conductive layer, the second transparent conductive layer, and the common substrate; the liquid crystal display panel comprises the second transparent conductive layer, the common substrate, the upper electrode, the upper alignment layer, the liquid crystal layer, the lower alignment layer, the thin film transistor, and the lower optical polarizer.

20. The liquid crystal display screen of claim 18, wherein the anisotropic conductive layer is a carbon nanotube layer comprising a plurality of carbon nanotubes substantially extending along a same direction.

* * * * *